Oct. 27, 1925.
M. B. RIZIANU
AUTOMOBILE COVER
Filed Sept. 15, 1924
1,559,458
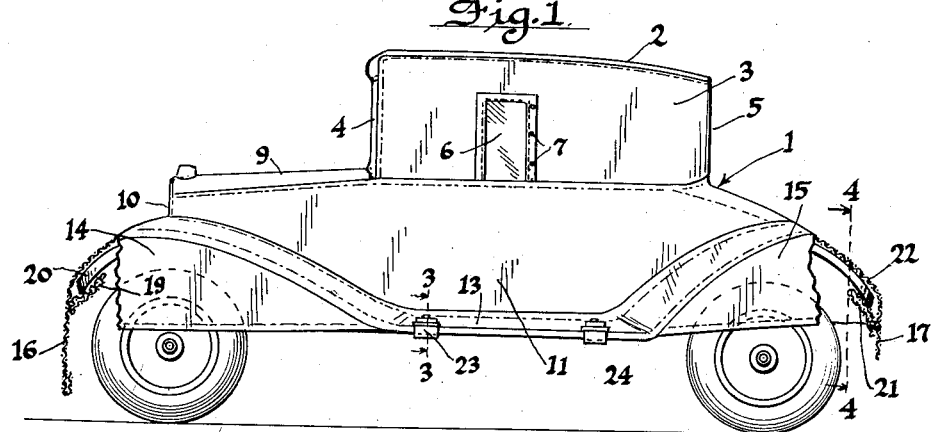
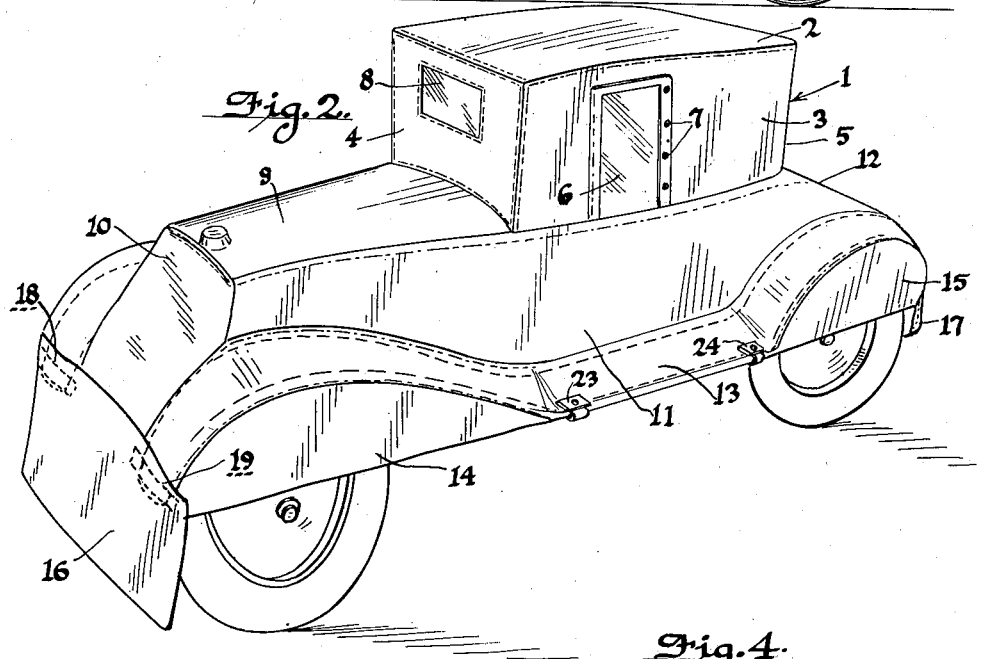
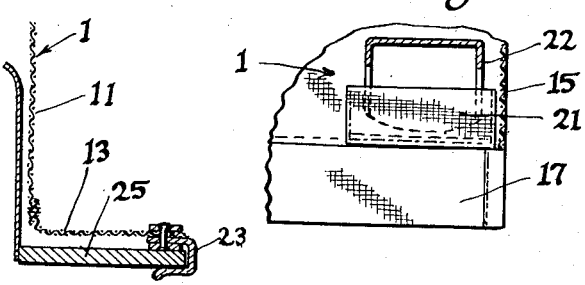
Witness:
W H Hall
Inventor:
Michael B. Rizianu.
By Hazard and Miller
Attorneys Patented Oct. 27, 1925.

1,559,458

UNITED STATES PATENT OFFICE.

MICHAEL B. RIZIANU, OF LOS ANGELES, CALIFORNIA.

AUTOMOBILE COVER.

Application filed September 15, 1924. Serial No. 737,853.

*To all whom it may concern:*

Be it known that I, MICHAEL B. RIZIANU, a citizen of Rumania, residing at Los Angeles, in the county of Los Angeles and State of California, have invented new and useful Improvements in Automobile Covers, of which the following is a specification.

This invention is a portable automobile cover and consists of the novel features herein shown, described and claimed.

An object is to make a neat and closely fitting portable cover for automobiles to protect the automobile from the sun, wind and storms and to protect the automobile and its occupants from cold.

Other objects and advantages will appear from the drawings and specification.

The drawings illustrate the construction and use of the automobile cover.

Figure 1 is a side elevation of an automobile with a cover applied in accordance with the principles of my invention.

Fig. 2 is a perspective.

Fig. 3 is an enlarged sectional detail on the line 3—3 of Fig. 1.

Fig. 4 is an enlarged fragmentary sectional detail on the line 4—4 of Fig. 1 and looking in the direction indicated by the arrows.

The details of construction and operation shown in the drawings are as follows:

The automobile cover 1 is made of suitable waterproof and weatherproof cloth or the like cut and sewed to substantially fit the automobile to which it is to be applied. While I have shown a particular type of automobile such as a coupe or roadster, it is to be understood that the principles of the invention may be applied to any style or type of automobile. The cover 1 consists of a top section 2, side sections 3, a front section 4, a back section 5, all cut and sewed as required to fit downwardly over and around the top of the automobile. The side sections 3 may have flaps 6 covering openings and removably secured in place by buttons or fasteners 7 so that an operator or occupant may loosen the buttons or fasteners to get into or out of the automobile. The front section 4 may have a window 8 of celluloid or the like so that the operator may see to guide the automobile.

A hood top section 9 extends forwardly from the lower part of the front section 4 and a radiator front section 10 extends downwardly from the forward end of the section 9. Side sections 11 extend downwardly from the side sections 3 and from the sides of the section 9 and backwardly from the section 10.

A rear cover section 12 extends backwardly from the lower part of the section 5. The fender cover sections 13 extend outwardly from the lower edges of the sections 11 and from the side edges of the sections 10 and 12, sections 13 being arches at the ends to cover the fenders and depressed at the centers to cover the running boards. Sections 14 and 15 are inserted at the outer edges of the arched portions of the sections 13. A flap or apron 16 extends downwardly from the forward lower ends of the section 10, the sections 13 and the sections 14, and a similar flap or apron 17 extends downwardly from the rear edges of the sections 12, 13 and 15. Pockets 18 and 19 are formed at the forward ends of the sections 13 to receive the extreme forward ends 20 of the fenders and similar pockets 21 are formed at the extreme rear ends of the sections 13 to receive the extreme rear ends 22 of the fenders so that when the cover is applied the pockets 21 may be applied to the rear ends 22 of the fenders and then the cover pulled forwardly until the pockets 18 and 19 are stretched beyond the forward ends 20 and then released to engage the forward ends 20, or this operation may be reversed and the front pockets applied first and the rear pockets afterwards.

Hooks 23 and 24 are fastened to the outer edges of the sections 13 to engage the running boards 25 and hold the sides of the cover downwardly and in line with the pockets at the ends of the fenders.

The drawings are diagrammatic and suggestive and the details of construction and material are suggestive and may be varied to suit the occasion and climate and automobile and as desired to increase or decrease the cost of the article.

While the cover is intended primarily to protect the automobile from the elements and climatic conditions, it is obvious that it may be used in cold and stormy countries to protect the occupants of the automobile and also to protect the automobile, especially the engine and radiator and fuel, from extreme cold as required to keep the automobile in operation in very cold climate. Obviously a warm cover over the hood and radiator and other parts of the automobile will hold the heat from radiating and keep the cold out and effect economy of fuel and keep the fuel and water from freezing.

It will be obvious that the apron 16 may be discarded and on account of the cover being held tight to the fenders by the pockets at the front and back and the clamps on the running board, that the automobile may be readily driven with the cover completely enclosing it, which is an advantage during cold or stormy weather. The window 8 may be made of sufficient size to be suitable under such conditions and the opening flaps 6 allow ready access to the interior of the automobile.

Various changes may be made without departing from the spirit of the invention as claimed.

I claim:

1. A completely removable cover of flexible material for an automobile, shaped to fit over the top and snugly around the body and hood of an automobile, with side sections along the side of the body and hood, fender sections secured to the side sections of the cover at substantially right angles thereto and shaped to cover the fenders and running board, and means to secure the fender sections in place and thereby secure the whole cover.

2. A completely removable cover as claimed in claim 1, in which the means to secure the fender sections in place are pockets at front and rear thereof to engage the front and back fenders.

3. A completely removable cover as claimed in claim 1, in which the means to secure the fender sections in place are hooks to engage the running board.

4. A completely removable cover as claimed in claim 1, in which the means to secure the fender sections in place comprise pockets at front and rear thereof to engage the front and back fenders and also hooks on said fender sections to engage the running board.

5. An automobile cover comprising in combination a completely removable cover made of flexible material adapted to fit snugly over the top of an automobile having a window in the front, an opening flat in the side, a cover for the hood, the radiator and back of the body with side sections fitting snugly against the sides of the body and hood, fender cover sections secured to the side sections and extending at substantially right angles thereto, said fender sections being shaped to substantially conform to the fenders and running board with depending skirt sections overlapping the wheels and means to secure the fender sections to the fenders and the running board.

6. An automobile cover as claimed in claim 5 in which the means to secure the fender sections to the fenders comprise pockets formed in the fender sections adapted to engage the front and back ends of the front and back fenders.

In testimony whereof I have signed my name to this specification.

MICHAEL B. RIZIANU.